United States Patent [19]

Nishii et al.

[11] Patent Number: 4,908,053
[45] Date of Patent: Mar. 13, 1990

[54] PROCESS FOR PRODUCING CHALCOGENIDE GLASS FIBER

[75] Inventors: Junji Nishii; Ikuo Inagawa, both of Kanagawa; Takashi Yamagishi, Hyogo; Shozo Morimoto; Ryuji Iizuka, both of Kanagawa, all of Japan

[73] Assignee: Non Oxide Glass Research and Development Co., Ltd., Tokyo, Japan

[21] Appl. No.: 232,998

[22] Filed: Aug. 17, 1988

[30] Foreign Application Priority Data

| Aug. 19, 1987 | [JP] | Japan | 62-204172 |
| Feb. 23, 1988 | [JP] | Japan | 63-38474 |
| Mar. 7, 1988 | [JP] | Japan | 63-51539 |
| Mar. 9, 1988 | [JP] | Japan | 63-53748 |

[51] Int. Cl.$^4$ .......................... C03B 37/027
[52] U.S. Cl. .......................... 65/3.11; 65/13; 65/32.4; 65/DIG. 15
[58] Field of Search .......... 65/2, 3, 11, 32.4, 13, 65/DIG. 15, 4.2

[56] References Cited

U.S. PATENT DOCUMENTS

| 4,277,270 | 7/1981 | Krohn | 65/13 X |
| 4,283,213 | 8/1981 | Akers et al. | 65/13 X |
| 4,451,116 | 5/1984 | Pinnow et al. | 65/2 X |
| 4,578,096 | 3/1986 | Siegmund | 65/3.11 |
| 4,600,422 | 7/1986 | Scott | 65/32.4 X |
| 4,602,926 | 7/1986 | Harrison et al. | 65/13 X |
| 4,636,235 | 1/1987 | Glessner et al. | 65/13 X |
| 4,652,288 | 3/1987 | Saito | 65/DIG. 15 |

OTHER PUBLICATIONS

T. Katsuyama et al., Appl. Phys. Lett, 45, p. 925 (1984) "Low Loss Ge-Se Chalcogenide Glass Optical Fibers".
Y. Katsuyama et al, Apply, Phys. Lett., 49, p. 22 (1986) "Low-Loss Te-Based Chalcogenide Glass Optical Fibers".
N. J. Pitt et al, Proc. of SPIE, 618, p. 124 (1986) "Telluride Glass Fibres for Transmission in the 8-12 Micrometers Waveband".
M. Saito et al, Appl. Optics., 24, p. 2304 (1985) "Infared Image Guide with Bundled As-S Glass Fibers".
T. Arai et al, Proc. of SPIE., 576, p. 24 (1985) "Co Laser Power Delivery by $As_2S_3$ IR Glass Fiber with Teflon Cladding".
P. Klocek et al, Opt. eng., 26, p. 88 (1987) "Chalcogenide Glass Optical Fibers and Image Bundles: Properties and Applications".
T. Kanamori et al, J. Lightwave Technology, LT-2, p. 607 (1984) "Chalcogenide Glass Fibers for Mid-Infrared Transmission".

*Primary Examiner*—Robert L. Lindsay
*Attorney, Agent, or Firm*—Cushman, Darby & Cushman

[57] ABSTRACT

A process for producing a chalcogenide glass fiber which comprises placing a cylindrical chalcogenide glass preform vertically in a cylindrical crucible furnished with a nozzle in its bottom portion, heating the crucible only at vicinity of the nozzle, and continuously drawing the glass into a fiber with the temperature of the crucible at the vicinity of the nozzle being maintained at such a level that the viscosity of the glass is within the range of $10^3$ to $10^{7.5}$ poises.

14 Claims, 7 Drawing Sheets

PROCESS FOR PRODUCING CHALCOGENIDE GLASS FIBER

FIELD OF THE INVENTION

The present invention relates to a process for producing a chalcogenide glass fiber having improved light-transmitting ability.

BACKGROUND OF THE INVENTION

Chalcogenide glasses are optical materials that have great ability to transmit IR radiation and which exhibit high chemical stability and heat resistance. By virtue of these characteristics, chalcogenide glasses have been extensively used as materials for making IR radiation transmitting windows and filters. If chalcogenide glasses could be drawn into fibers, they would be suitable for use not only as information transmitting lightguides of the type that has already been realized with silica glass fibers but also as waveguides for transmission of energy (such as those generated from CO and $CO_2$ lasers) and radiation thermometers.

Chalcogenide glasses are glasses containing as a main component(s) sulfur (S), selenium (Se) and/or tellurium (Te), and their IR radiation transmitting range is shifted to the longer wavelength side by increasing the concentration of Be which has the largest atomic weight. If chalcogenide glass fibers are to be used as waveguides for energy transmission or radiation thermometers, it is preferable for the Te concentration to be increased. However, as the Te concentration increases, the glass becomes more unstable against crystallization, thereby making it difficult to draw fibers from the glass. Furthermore, chalcogenide glasses are highly reactive with oxygen, which will cause strong absorption in the wavelength range of 6 to 14 $\mu$m. Therefore, chalcogenide glasses, especially those containing large amounts of Te, must be drawn into fibers at the lowest possible temperature and within an oxygen-free inert atmosphere.

It is generally desirable for optical fibers to have a core-cladding structure in which the core material is surrounded with a certain thickness of cladding material having a lower refractive index than the core material. This core-cladding structure is preferred not only for the purpose of reducing the transmission loss of the fiber but also for improving its mechanical strength and weatherability. Arai et al. conducted an experiment involving transmitting the power of a CO laser through $As_2S_3$ glass fiber with a Teflon coating as a cladding material and they reported the occurrence of an increased transmission loss in the wavelength range of 2 $\mu$m or longer on account of absorption by Teflon coating (T. Arai, M. Kikuchi, S. Sakuragi, M. Saito and M. Takizawa; *Proc. of SPIE*, 576 (1985) 24). It is, therefore, desirable for the chalcogenide glass fiber to have a cladding that is made of a material having no absorption in the IR range, preferably a chalcogenide glass.

While several methods for drawing chalcogenide glasses into fibers have been reported, none of them have yet reached the commercial stage. One method consists of melting a chalcogenide glass in a crucible with a nozzle in its bottom portion and drawing a fiber through the nozzle with the interior of the crucible being pressurized with argon gas (T. Katsuyama, K. Ishida, S. Satho, and H. Matumura; *Appl. Phys. Lett.*, 45 (1984) 925, and N. J. Pitt, G. S. Sapsford, T. V. Clapp, R. Worthington and M. G. Scott; *Proc. of SPIE*, 618 (1986) 124). This approach is effective in retarding the crystallization of glass and maintaining an inert atmosphere, and GeSe and GeAsSe glass fibers have been prepared by this method. This method, however, has two main disadvantages; it is unable to produce a fiber having a core-cladding structure, and it is difficult to perform continuous drawing operations for an extended period because all of the chalcogenide glass in the crucible is uniformly heated and this sometimes leads to devitrification of the residual chalcogenide glass in the crucible during the drawing operation. P. Klocek et al. prepared a Ge-Sb-Se fiber having a core-cladding structure by the rod-in-tube preform method which is commonly employed to manufacture silica glass fibers (P. Klocek, M. Roth, and R. D. Rock; *Opt. Eng.*, 26 (1987) 88). Their method consists of inserting a cylindrically worked core rod into a cladding tube which is also cylindrical in shape and drawing them simultaneously into a fiber. However, the resulting fiber shows a strong absorption peak due to the presence of oxide at a wavelength of about 8 $\mu$m and it also suffers a high transmission loss ($\geq$ 5 dB/m) in the wavelength range of 3 to 11 $\mu$m. It is probable that these problems are not only caused by the oxidation of the surface of the chalcogenide glass during drawing but also by light scattering due to structural imperfections at the core-cladding interface.

SUMMARY OF THE INVENTION

An object, therefore, of the present invention is to provide an improved process for producing a chalcogenide glass fiber which comprises placing a cylindrical chalcogenide glass preform vertically in a cylindrical crucible furnished with a nozzle in its bottom portion, heating the crucible only at vicinity of the nozzle, and continuously drawing the glass into a fiber, with the temperature of the crucible at the vicinity of the nozzle being maintained at such a level that the viscosity of the glass is within the range of $10^3$ to $10^{7.5}$ poises.

DETAILED DESCRIPTION OF THE INVENTION

The chalcogenide glass preferably used in the present invention is a glass containing at least one chalcogen element selected from S, Se and Te, and further containing at least one element selected from Ge, As, Sb, Tl, Pb, Si, P, Ga, In, Cl, Br and I, with those containing a large amount (at least 25 mol %, particularly 50 mol % or more) in total of the components Se and Te being more preferred.

The cylindrical chalcogenide glass fiber preform which is vertically placed in the cylindrical crucible is heated at the vicinity of the nozzle such that the viscosity of the glass at the vicinity of the nozzle is within the range of $10^3$ to $10^{7.5}$ poises and preferably from $10^{5.5}$ to $10^{6.8}$. The term "vicinity of the nozzle" herein used generally means the region of not more than 40 mm, preferably not more than 30 mm, in vertical direction from the tip of the nozzle.

In drawing a fiber from the preform as it is heated in the crucible at the vicinity of the nozzle in the process of the present invention, it is preferred to maintain an inert gas (e.g., argon and nitrogen) atmosphere within the crucible, with the pressure in the crucible generally being held higher than atmospheric pressure but not higher than 5 kg/cm$^2$ and preferably from 0.5 to 2.0 kg/cm$^2$. If an inert atmosphere is not maintained in the crucible, oxygen will get into the crucible and oxidize the chalcogenide glass to produce a fiber with a high transmission loss. If the pressure in the crucible is below atmospheric pressure, the glass will, of course, fail to flow out of the crucible through the nozzle. If the pressure in the crucible exceeds 5 kg/cm$^2$, difficulty will be encountered in controlling the diameter of the fiber drawn. What is more, the mechanical strength of the fiber may decrease in some cases.

In the process of the present invention, it is preferred that the inside diameter of the nozzle at the base of the crucible be no smaller than 500 μm, more preferably not less than 1.5 mm, with the upper limit being 0.95, more preferably not more than 0.8, as expressed by $R_1/R_2$ where $R_1$ is the nozzle inside diameter and $R_2$ is the outside diameter of the preform. If the inside diameter of the nozzle is smaller than 500 μm, the drawing speed becomes very slow and the glass is heated at the vicinity of the nozzle for an unduly extended period of time, causing occasional devitrification of the glass. If the value of $R_1/R_2$ is greater than 0.95, the adhering area of the preform to the inner surface of the crucible becomes so narrow that it is impossible to pressurize the interior of the crucible sufficiently to attain high drawing speed. If undue or strained pressure is applied, a through-hole might be opened in part of the adhering area of the preform to the inner surface of the crucible in the heating zone near the nozzle, and the inert gas serving as a pressurizing medium might leak out of the crucible to interrupt the drawing operation.

In the process of the present invention, the cylindrical preform to be placed within the crucible is desirably formed in such a way that its diameter is smaller than the inside diameter of the crucible while the gap between the crucible and the preform is at least 2%, preferably at least 10%, of the inside diameter of the crucible. If the gap between the crucible and the preform is smaller than 2% of the inside diameter of the crucible, the preform will sometimes fail to move smoothly within the crucible, thereby producing a fiber having an oval cross section or making a through-hole in part of the adhering area of the preform to the inner surface of the crucible in the heating zone near the nozzle. As already mentioned, such a through-hole might lead to leakage from the crucible of the inert gas serving as a pressurizing medium, thereby causing an interruption of the drawing operation.

In accordance with the process of the present invention, a chalcogenide glass fiber having a core-cladding structure can be produced by drawing a chalcogenide glass preform which consists of a core glass in rod shape that is inserted into a cladding glass in tube form having a lower refractive index than the core glass, wherein both core glass and cladding glass are preferably composed of chalcogenide glass. It is not preferred to use as a cladding material a resin, or glasses other than chalcogenide glass such as an oxide glass (e.g., $SiO_2$ and $B_2O_3$) and a fluoride glass (e g., $BaF_2$-$LaF_3$-$ZrF_4$) since these materials exhibit absorption of mid-IR ray in the wavelength of 4 μm or longer, resulting in an increased transmission loss of the core-cladding fiber A fiber that will exhibit a sufficiently low transmission loss can be obtained by performing the fiber drawing operation with the pressure of the gas around the cladding tube of the preform being held higher than that of the gas in the gap between the cladding tube and the core rod. It is desirable for the inert gas in the gap between the cladding tube of the preform and the core rod to be held at a pressure of no higher than $10^{-1}$ Torr, preferably no higher than $10^{-2}$ Torr. It is also desirable for the inert gas around the cladding tube to be held at a pressure of at least 0.2 kg/cm$^2$, preferably at least 1.0 kg/cm$^2$. If the pressure of the inert gas in the gap between the cladding tube and the core rod is higher than $10^{-1}$ Torr and if the pressure of the inert gas around the cladding tube is lower than 0.2 kg/cm$^2$, the resulting fiber will have poor adhesion between the core and the cladding and suffer from increased scattering loss due to structural imperfections at the core-cladding interface.

In the process of the present invention, a cladding tube that has adhered to a core rod to form a unitary assembly may be used as a preform to be placed within the crucible and this eliminates the need to reduce the pressure in the gap between the cladding tube and the core rod. The following method is preferably employed in forming a unitary assembly of the core rod and the cladding tube: the core rod is inserted into the cladding tube and the combination is held in a closed vessel in which an inert atmosphere is maintained; and the cladding tube is softened locally and continuously from one end to the other with the pressure of the inert gas in the gap between the cladding tube and the core rod being held no higher than $10^{-1}$ Torr, preferably no higher than $10^{-2}$ Torr, and with the pressure of the inert gas around the cladding tube being held no lower than 0.2 kg/cm$^2$, preferably no lower than 1.0 kg/cm$^2$. If the pressure of the inert gas in the gap between the cladding tube and the core rod is higher than $10^{-1}$ Torr and if the pressure of the inert gas around the cladding tube is lower than 0.2 kg/cm$^2$, the resulting fiber will have poor adhesion between the core and the cladding and suffer from increased scattering loss due to structural imperfections at the core-cladding interface. If the cladding tube is allowed to adhere to the core rod by uniform heating of the entire portion of the preform with the pressure of the inert gas in the gap between the cladding tube and the core rod being reduced to $10^{-1}$ Torr or below and with the pressure of the inert gas around the cladding tube being increased to 0.2 kg/cm$^2$ or above, residual gas tends to remain as bubbles between the cladding tube and the core rod and a fiber that suffers from increased scattering loss will be produced when the preform composed of such cladding tube and core rod is drawn.

A cladding tube suitable for use in the process of the present invention is preferably formed by the following procedures: the chalcogenide glass of which the cladding tube is to be made is sealed in a cylindrical closed vessel; with the cylindrical vessel being held horizontally, the chalcogenide glass is heated to a temperature higher than its softening point and held at that temperature for a predetermined period (generally at least 5 minutes and preferably about 60 minutes) as the vessel is rotated around its longitudinal axis; and thereafter the chalcogenide glass is cooled to the annealing point (generally, cooled to the temperature at which the viscosity of the glass is $10^{13}$ poises), while the cylindrical vessel is kept rotating. In accordance with this method, the inner surface of the resulting cladding tube will become an optically ideal specular surface, so it is possible to obtain a fiber that is freed from scattering loss due to the structural imperfections at the core-cladding interface. If the cylindrical vessel in which the chalcogenide glass for the cladding tube is placed is not closed, it is necessary to maintain an inert gas atmosphere around the vessel during heating, and thus it is not preferred. An additional disadvantage is that the components of the chalcogenide glass may evaporate during the heating operation to cause potential fluctuations in the composition of the chalcogenide glass. The cylindrical vessel is desirably heated to a temperature higher than the softening point of the chalcogenide glass, preferably to such a temperature that the viscosity of the melt of the chalcogenide glass is not higher than $10^4$ poises and more preferably not higher than $10^2$ poises. If the vessel is not heated to the temperature higher than the softening point of the chalcogenide glass, it is difficult to obtain a cladding tube having a uniform wall thickness. In addition, devitrification of the chalcogenide glass may sometimes occur. The rotational speed of the cylindrical vessel depends on the viscosity of the melt of the chalcogenide glass but usually a value of 20 rpm or higher and preferably 100 ppm or higher. If the rotational speed of the cylindrical vessel is lower than 20 rpm, it is difficult to obtain a cladding tube having a uniform wall thickness.

Figure 1:
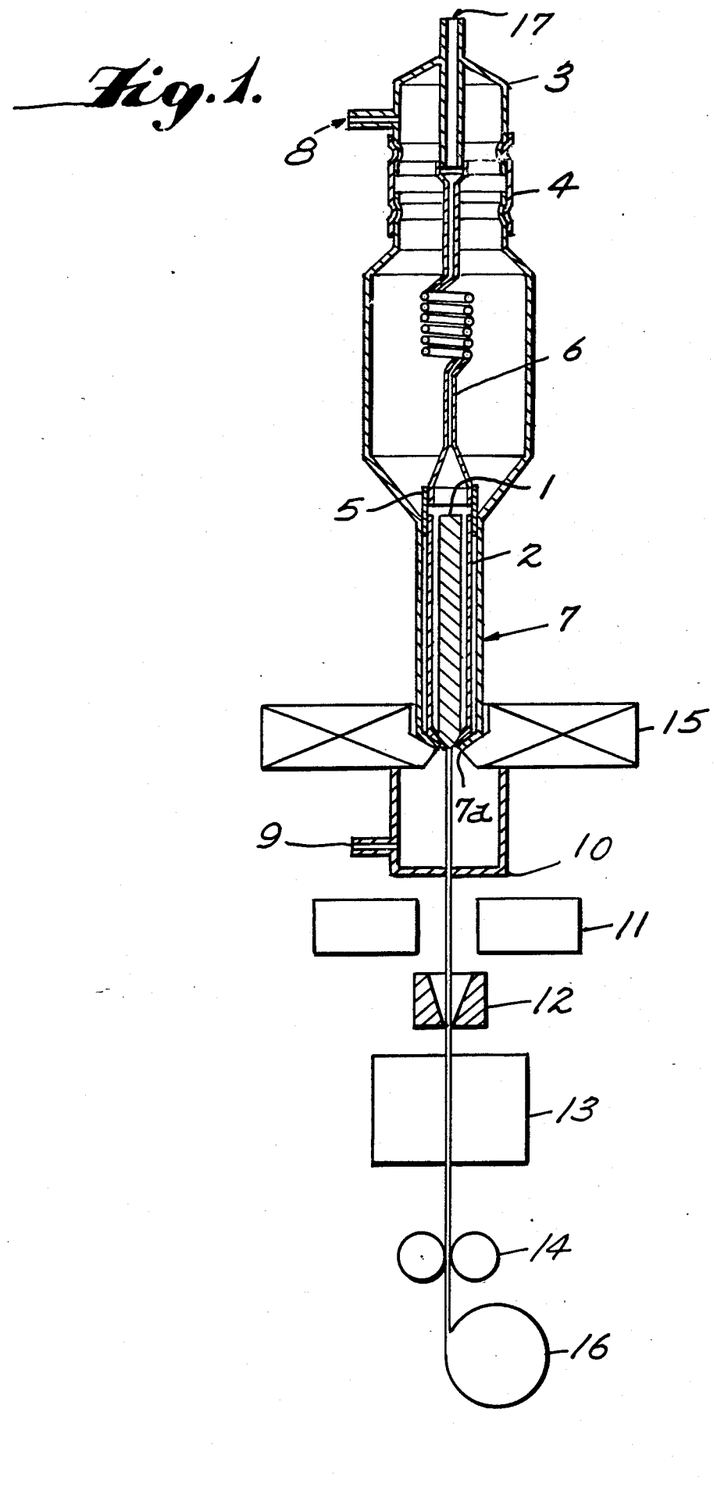
FIGS. 1 and 2 show schematically the apparatus used to produce chalcogenide glass fibers in the Examples of the present invention.
Figure 2:
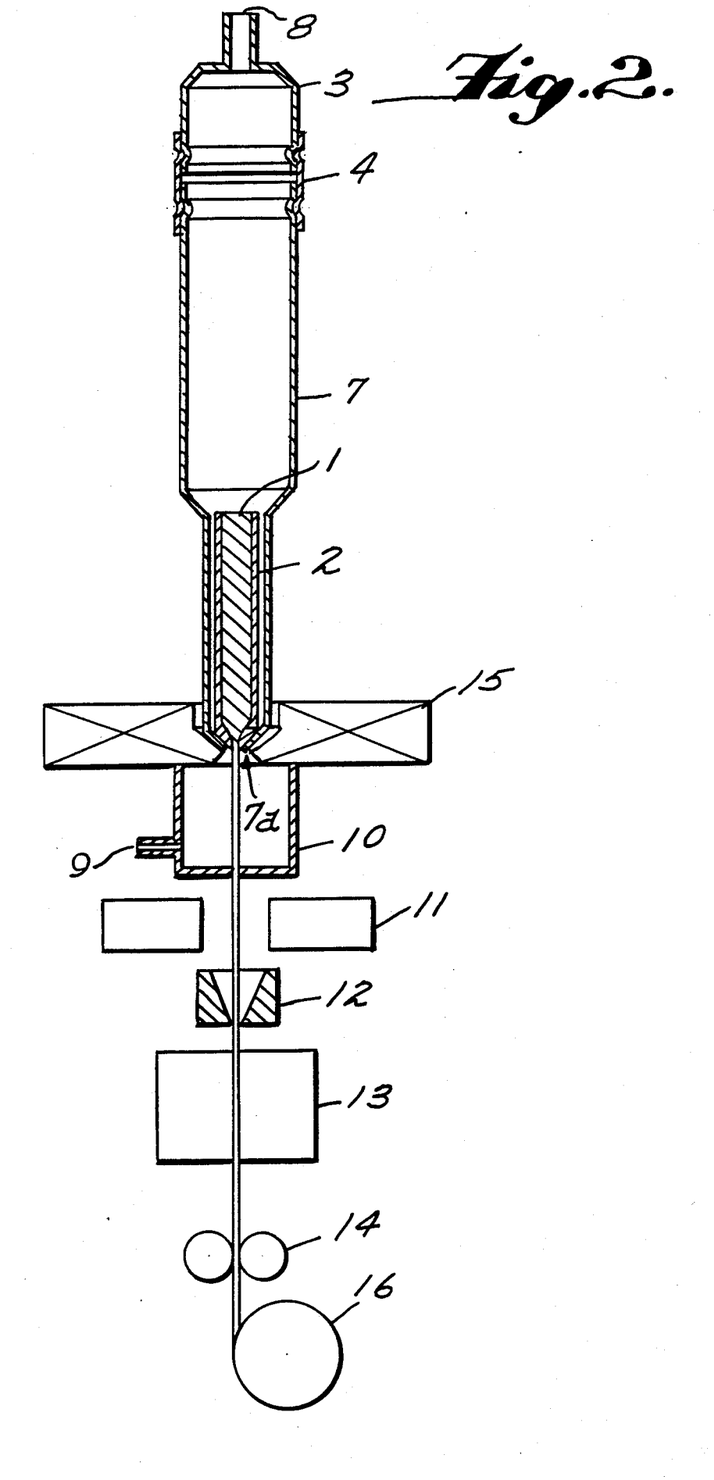

FIGS. 1 and 2 are vertical sections of the apparatus that can be used to perform the process of the present invention. FIG. 1 shows schematically an apparatus for drawing a fiber from the combination of a core rod and a cladding tube with the pressure in the gap between the core rod and the cladding tube being held subatmospheric while the pressure around the cladding tube is held superatmospheric. FIG. 2 shows schematically an apparatus for drawing a fiber either from a unitary assembly of the core rod and the cladding tube adhering each other or from the core rod alone. In either apparatus, a crucible 7 having a nozzle 7a on its bottom is positioned above a local heater 15, an atmosphere conditioning chamber 10 with an inlet 9 for an inert gas, a fiber diameter measuring instrument 11, a resin coater 12, a UV irradiation chamber 13, print rollers 14, and a take-up drum 16. The top of the crucible 7 is connected via a resin tube 4 to a cover 3 that is furnished with an inlet 8 for introducing a pressurizing inert gas. The cover of the apparatus shown in FIG. 1 is also furnished with a suction port 17 for creating a vacuum which is connected to a sucking resin tube 6, the lower end of which is connected to a cladding tube 2 around a core rod 1 via a resin tube 5.

The present invention is described hereinafter in greater detail with reference to examples which are given here for illustrative purposes only and are by no means intended to limit the present invention.

EXAMPLE 1

A chalcogenide glass fiber having a core-cladding structure was produced using an apparatus of the type shown in FIG. 1.

A core rod 1 with a diameter of 8.8 mm and a length of 150 mm that consisted of 25 mol % Ge, 20 mol % As, 25 mol % Se and 30 mol % Te was inserted into a cladding tube 2 with an inside diameter of 9 mm, an outside diameter of 12.5 mm and a length of 160 mm which consisted of 20 mol % Ge, 30 mol % As, 30 mol % Se and 20 mol % Te. The combination of the core rod and the cladding tube was placed vertically within a crucible 7 having an inside diameter of 13 mm and which had a nozzle 7a with a diameter of 2 mm in its bottom portion.

Figure 3:
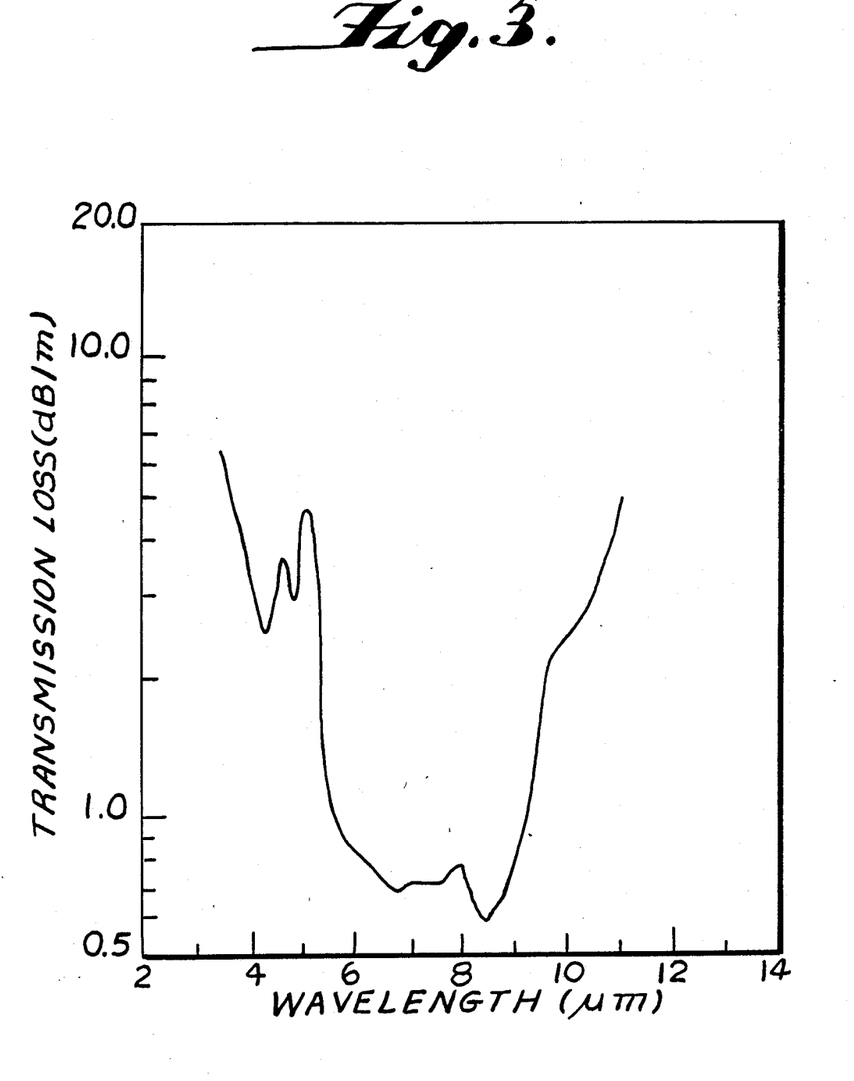
FIGS. 3 to 6 show the transmission loss spectra of the core-cladding type fibers produced in Examples 1 to 4 of the present invention.

Before starting the drawing operation, argon gas was supplied into the apparatus at a flow rate of 300 cc/min over a period of 30 minutes through the inlet 8, the suction port 17 and the inlet 9 on the chamber 10. Thereafter, the supply of argon gas through the inlet 8 and the suction port 17 was stopped and the bottom portion of the crucible was selectively heated with the heater 15 to a temperature at which the viscosities of the cladding tube 2 and the core rod 1 became $10^6$ poises. After the cladding tube 2 had uniformly adhered to the core rod 1, as well as to the circumference of the basal nozzle, argon gas was again supplied through the inlet 8 so as to pressurize the atmosphere around the cladding tube 2 at 1.5 kg/cm$^2$ while the gap between the cladding tube 2 and the core rod 1 was evacuated to $10^{-2}$ Torr using the suction port 17 connected to the resin tube 6. As a result of these procedures, the cladding tube 2 fused completely to the core rod 1 in the area near the heater 15 to form a unitary assembly, which could be drawn through the nozzle 7a into a continuous fiber having a core diameter of 300 μm and a cladding diameter of 420 μm at a speed of 1 m per minute. Immediately after passing through the chamber 10 and instrument 11, the fiber was fed into the resin coater 12 where it was coated with a UV radiation curable acrylic resin. After the resin coating was cured by UV irradiation in the chamber 13, the fiber was passed through the print rollers and taken up on the drum 17. The transmission loss spectrum of the fiber is shown in FIG. 3. The fiber exhibited a minimum loss of 0.6 dB/m at a wavelength of about 8.5 μm. The minimal bending radius of the fiber was no greater than 15 mm.

EXAMPLES 2 TO 4

Figure 4:
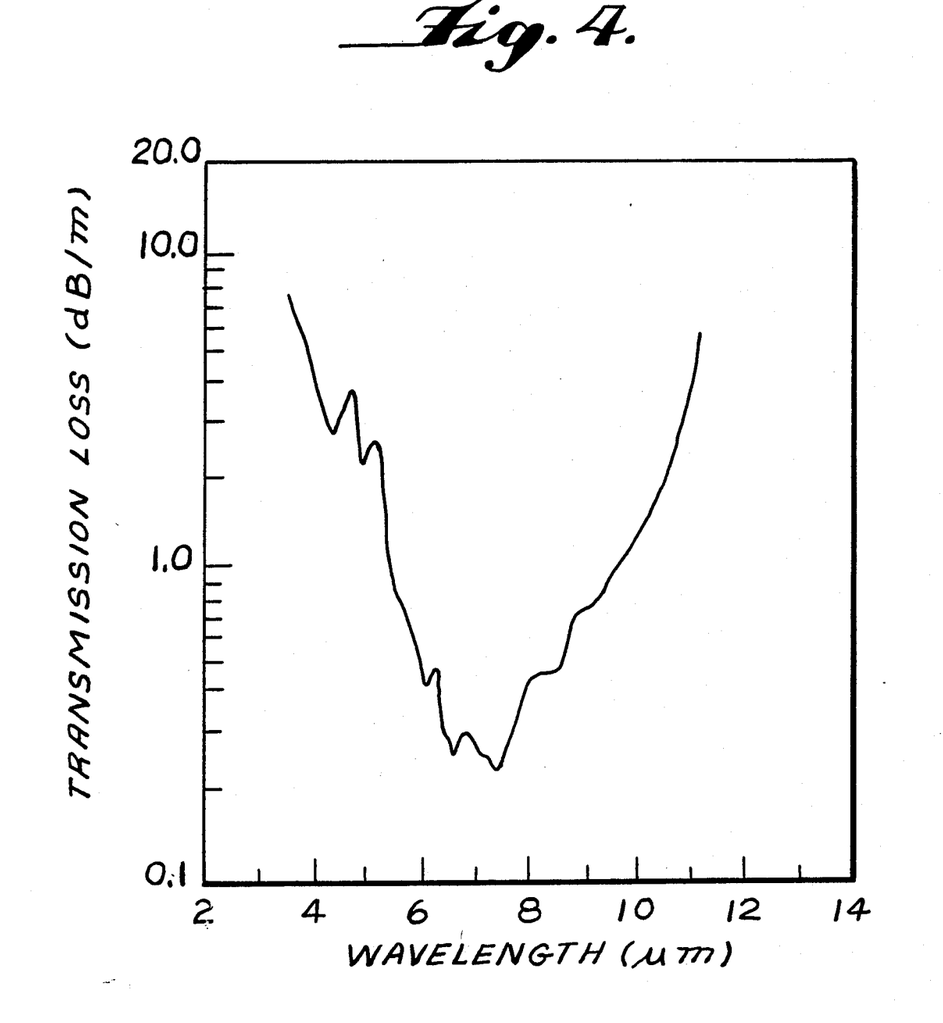
Figure 5:
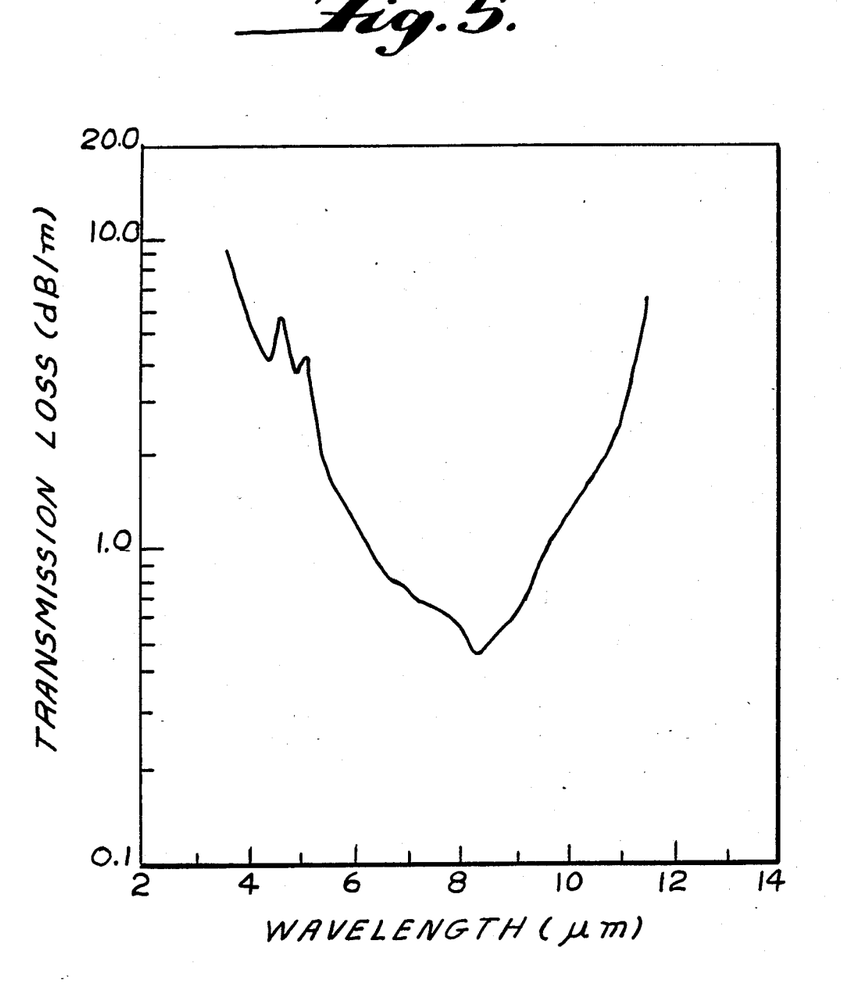
Figure 6:
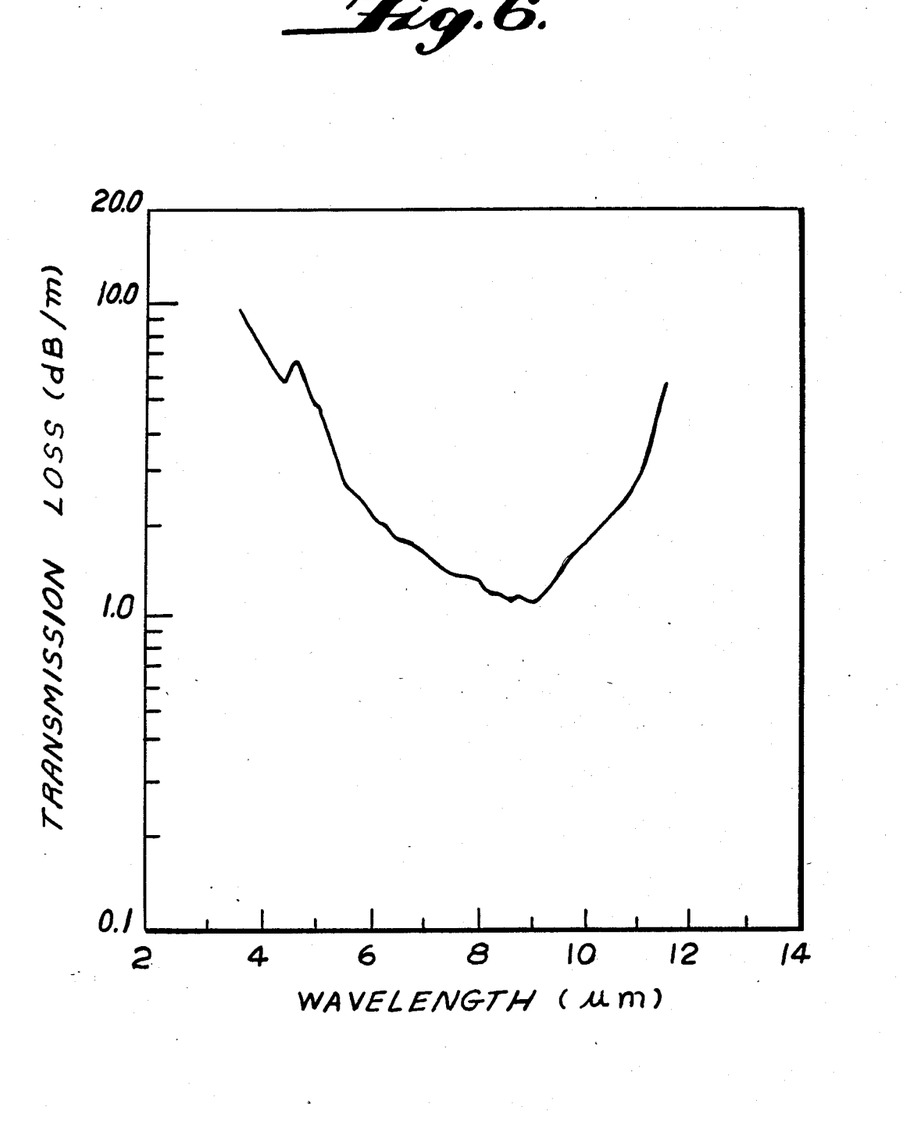

A core rod 1 having a diameter of 8.8 mm and a length of 150 mm and a cladding tube 2 having an inside diameter of 9 mm, an outside diameter of 12.5 mm and a length of 160 mm were prepared from the compositions shown in Table 1. Using the same procedures as those employed in Example 1, fibers having a core diameter of 300 μm and a cladding diameter of 420 μm were drawn continuously at a speed of 1 m per minute. The transmission loss spectra of the fibers are shown in FIGS. 4 to 6. The fiber produced in Example 2 exhibited a minimum loss of 0.2 dB/m at 7.3 μm. Each of the three fibers exhibited a transmission loss of 1.8 dB/min at 0.6 μm which was the operating wavelength of a CO$_2$ laser. The minimal bending radius of each fiber was not greater than 15 mm.

TABLE 1

| Example No. | Glass Composition (atomic %) | | Transmission Loss Spectrum |
|---|---|---|---|
| | Core rod | Cladding tube | |
| 2 | Ge$_{27}$Se$_{18}$T$_{55}$ | Ge$_{17}$As$_{20}$Se$_{33}$Te$_{30}$ | FIG. 4 |
| 3 | Ge$_{29}$Se$_{19.5}$Te$_{51.5}$ | Ge$_{18}$As$_{20}$Se$_{32}$Te$_{30}$ | FIG. 5 |
| 4 | Ge$_{31}$Se$_{21}$Te$_{48}$ | Ge$_{18.5}$As$_{20}$Se$_{31.5}$Te$_{30}$ | FIG. 6 |

EXAMPLE 5

Figure 7:
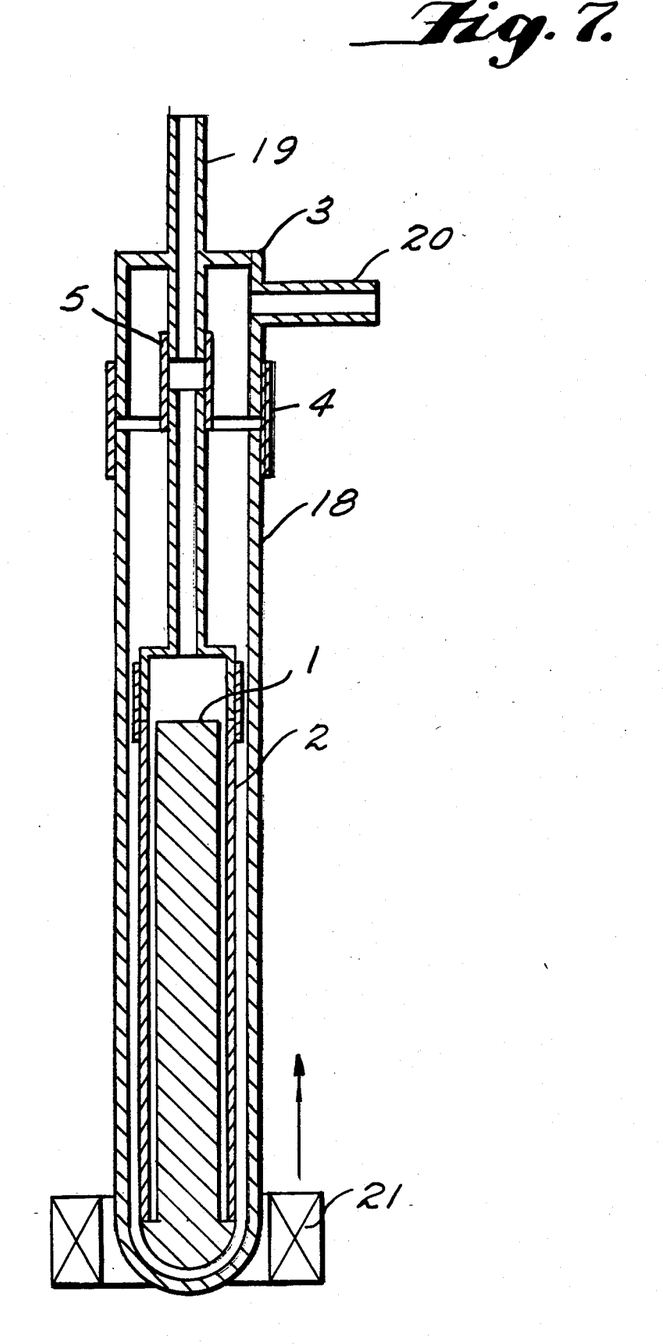
FIG. 7 shows schematically an apparatus that can be used to prepare a preform that has a cladding tube fused with a core rod into a unitary assembly.

Using an apparatus of the type shown in FIG. 7, a preform composed of a cladding tube adhering to a core rod was prepared by the following procedures. A core rod 1 having a diameter of 8.8 mm and a length of 150 mm and which consisted of 25 mol % Ge, 20 mol % As, 25 mol % Se and 30 mol % Te was inserted into a cladding tube 2 having an inside diameter of 9 mm, an outside diameter of 12.5 mm and a length of 160 mm and which consisted of 20 mol % Ge, 30 mol % As, 30 mol % Se and 20 mol % Te. The combination of the core rod and cladding tube was held vertically in a closed vessel 18 the top of which is connected via a resin tube 4 with a cover 3 that is furnished with an inlet 20 for introducing a pressurizing argon gas, and the lower end of a suction tube 19 was connected to the cladding tube 2 via a resin tube 5; thereafter, the gap between the cladding tube 2 and the core rod 1 was evacuated to $10^{-2}$ Torr while the atmosphere around the cladding tube 2 was pressurized to 1.5 kg/cm$^2$ by means of argon gas. Then, the cladding tube 2 was heated locally and continuously from bottom to top with a local heater 21 positioned around the bottom of the closed vessel, thereby allowing the cladding tube 2 to adhere to the core rod 1.

The resulting preform which consisted of a unitary assembly of the core rod and cladding tube was placed vertically in the crucible 7 of an apparatus of the type shown in FIG. 2. Before starting the drawing operation, argon gas was supplied into the crucible at a flow rate of 300 cc/min over a period of 30 minutes through the inlet 8 and an inert gas inlet 9 on the chamber 10. Thereafter, the supply of argon gas through the inlet 8 was stopped and the bottom portion of the crucible was selectively heated with the heater 15 to a temperature at which the viscosity of the preform became $10^6$ poises. After the preform had adhered uniformly to the circumference of the basal nozzle, argon gas was again supplied through the inlet 8 so as to pressurize the atmosphere around the preform at 1.5 kg/cm$^2$. As a result of these procedures, a continuous fiber having a core diameter of 300 μm and a cladding diameter of 420 μm was successfully drawn from the preform through the nozzle 7a at a speed of 1.5 m per minute. The transmission loss of the fiber was substantially the same as that of the fiber prepared in Example 1.

COMPARATIVE EXAMPLE 1

A chalcogenide glass fiber having a core-cladding structure was produced using an apparatus of the type shown in FIG. 1. A preform consisting of a core rod 1 and a cladding tube 2 having the same compositions and sizes as those shown in Example 1 was placed vertically within the crucible 7 and it was drawn into a fiber by the same procedures as those employed in Example 1, except that the core rod 1 and the cladding tube 2 were heated with the local heater 15 such that the viscosity of both core rod and cladding tube was $10^{2.5}$ poises. For the first two minutes from the beginning of drawing, a continuous fiber having a core diameter of 300 μm and a cladding diameter of 420 μm was successfully drawn at a speed of 3 m per minute. Thereafter, the preform in the crucible started to become devitrified and in 5 minutes it was no longer possible to draw a fiber from this preform.

COMPARATIVE EXAMPLE 2

An attempt was made to draw a fiber from a preform consisting of a core rod 1 and a cladding tube 2 having the same compositions and sizes as those shown in Example 1 by employing the same procedures as those used in Comparative Example 1, except that the core rod 1 and the cladding tube 2 were heated with the local heater 15 such that the viscosity of core rod and cladding tube was 108 poises. Because of the extremely high viscosity of the preform, a glass fiber could not be drawn from the nozzle 7a.

COMPARATIVE EXAMPLE 3

A chalcogenide glass fiber having a core-cladding structure was produced using an apparatus of the type shown in FIG. 1. A preform consisting of a core rod 1 and a cladding tube 2 having the same compositions and sizes as those shown in Example 1 was placed vertically within the crucible 7 and it was drawn into a fiber by the same procedures as those employed in Example 1, except that the nozzle 7a in the bottom portion of the crucible 7 was 450 μm. In order to obtain a fiber having an outside diameter of 420 μm, an argon pressure of at least 3.5 kg/cm$^2$ had to be applied to the circumference of the preform while the core rod 1 and the cladding tube 2 were heated with the local heater 15 such that the viscosity of both core rod and cladding tube was $10^{2.7}$ poises. Three minutes after the start of the drawing operation, the preform in the crucible began to devitrify and in 5 minutes it was no longer possible to draw a fiber from this preform. It was also very difficult to control the fiber diameter during the drawing operation.

COMPARATIVE EXAMPLE 4

An attempt was made to draw a fiber from a preform consisting of a core rod 1 and a cladding tube 2 having the same compositions and sizes as those shown in Example 1 by employing the same procedures as those used in Comparative Example 3, except that the value of $R_1/R_2$ ($R_1$: the inside diameter of the basal nozzle 7a; $R_2$: the outside diameter of the preform) was set at 0.98. In order to compensate for the small area of fusion between the crucible 7 and the preform, an argon pressure of 0.5 kg/cm$^2$ was exerted on the circumference of the preform. As a result, a through-hole was opened in part of the adhering area of the preform to the inner surface of the crucible 7, and the argon gas serving as a medium for pressurizing the interior of the crucible leaked out to render the drawing operation impossible. When the drawing temperature was raised in an effort to prevent the leakage of the argon gas, the preform in the crucible became devitrified to make subsequent drawing operations impossible.

COMPARATIVE EXAMPLE 5

A chalcogenide glass fiber having a core-cladding structure was produced using an apparatus of the type shown in FIG. 1. A preform having the same composition as the one shown in Example 1 was placed vertically within the crucible 7 and drawn to form a fiber by the same procedures as those employed in Example 1, except that the preform consisted of a core rod 1 having a diameter of 8.8 mm and a length of 150 mm and a cladding tube 2 having an inside diameter of 9 mm, an outside diameter of 12.9 mm and a length of 160 mm. For the first 2 minutes from the beginning of drawing, a fiber was successfully drawn as in Example 1. But, thereafter, a through-hole was opened in part of the adhering area of the preform to the inner surface of the crucible 7, and the argon gas by means of which the interior of the crucible was pressurized leaked out to render subsequent drawing operations impossible.

COMPARATIVE EXAMPLE 6

A chalcogenide glass fiber having a core-cladding structure was produced using an apparatus of the type shown in FIG. 2. A core rod 1 having a diameter of 8.8 mm and a length of 150 mm and which consisted of 25 mole % Ge, 20 mol % As, 25 mol % Se and 30 mol % Te was inserted into a cladding tube 2 having an inside diameter of 9 mm, an outside diameter of 12.5 mm and a length of 160 mm and which consisted of 20 mol % Ge, 30 mol % As, 30 mol % Se and 20 mol % Te. Without effecting adhesion of the two members to form a unitary preform, the combination thereof was placed vertically within the crucible 7 with an inside diameter of 13 mm which had a nozzle 7a with a diameter of 2 mm in its bottom portion. Thereafter, the cladding tube was heated such that it adhered uniformly to the circumference of the basal nozzle, by the same procedures as those employed in Example 5, and argon gas was supplied into the crucible through the inlet 8 so as to pressurize the interior of the crucible 7 at 1.5 kg/cm². As a result, a continuous fiber having a core diameter of 300 μm and a cladding diameter of 420 μm was successfully drawn through the nozzle 7a at a speed of 1 m per minute. However, the resulting fiber, which contained a chain of bubbles at the core-cladding interface in its longitudinal direction, was very easy to break and its minimum bending radius was no smaller than 100 mm. Furthermore, this fiber exhibits a transmission loss of at least 3 dB/m over the full wavelength range tested.

The process of the present invention allows the production of a core-cladding chalcogenide glass fiber which has been difficult to fabricate by the conventional crucible method. The resulting fiber is free from structural imperfections at the core-cladding interface, has high mechanical strength and suffers low transmission loss.

While the invention has been described in detail and with reference to specific embodiments thereof, it will be apparent to one skilled in the art that various changes and modifications can be made therein without departing from the spirit and scope thereof.

What is claimed is:

1. A process for producing a chalcogenide glass fiber which comprises placing a cylindrical chalcogenide glass preform vertically in a cylindrical crucible furnished with a nozzle in its bottom portion, heating the crucible only at vicinity of the nozzle, and continuously drawing the glass into a fiber with the temperature of the crucible at the vicinity of the nozzle being maintained at such a level that the viscosity of the glass is within the range of $10^3$ to $10^{7.5}$ poises.

2. A process according to claim 1, wherein a fiber is drawn from the preform as it is heated in the crucible where an inert gas atmosphere is maintained with the pressure in said crucible being held higher than atmospheric pressure but not higher than 5 kg/cm².

3. A process according to claim 1, wherein the inside diameter $R_1$ of the nozzle in the bottom portion of the crucible is no smaller than 500 μm, with the upper limit being 0.95 as expressed by $R_1/R_2$ where $R_1$ is the nozzle inside diameter and $R_2$ is the outside diameter of the preform.

4. A process according to claim 1, wherein the cylindrical preform has a diameter smaller than the inside diameter of said crucible, and the gap between the crucible and the perform is at least 2% of the inside diameter of said crucible.

5. A process according to claim 1, wherein said chalcogenide glass preform consists of a core glass in a rod shape that is inserted into a tube of a cladding glass having a lower refractive index than said core glass.

6. A process according to claim 5, wherein a fiber is drawn from the preform in the crucible with the pressure of the gas around the cladding tube of the preform being held higher than that of the gas in the gap between the cladding tube and the core rod.

7. A process according to claim 6, wherein the inert gas in the gap between the cladding tube of the preform and the core rod has a pressure of no higher than $10^{-1}$ Torr, and the inert gas around the cladding tube has a pressure of at least 0.2 kg/cm².

8. A process according to claim 5, wherein the cladding tube is allowed to adhere to the core rod thereby to form a unitary assembly before they are placed within the crucible.

9. A process according to claim 8, wherein the cladding tube is allowed to adhere to the core rod by inserting the core rod into the cladding tube and holding the combination in a closed vessel in which an inert atmosphere is maintained; and softening the cladding tube locally and continuously from one end to the other with the pressure of the inert gas in the gap between the cladding tube and the core rod being held no higher than $10^{-1}$ Torr and with the pressure of the inert gas around the cladding tube being held no lower than 0.2 kg/cm².

10. A process according to claim 5, wherein the cladding tube is fabricated by charging a cylindrical closed vessel with a chalcogenide glass of which said cladding tube is to be made; heating, with the cylindrical vessel being held horizontally, the chalcogenide glass to a temperature higher than its softening point and holding it at that temperature as the vessel is rotated around its longitudinal axis; and thereafter cooling the chalcogenide glass to the annealing point with the cylindrical vessel being kept rotating.

11. A process according to claim 10, wherein said cylindrical vessel is rotated at a speed of at least 20 rpm during the fabrication of the cladding tube.

12. A process for producing a chalcogenide glass fiber which comprises placing:
   a cylindrical chalcogenide glass preform vertically in a cylindrical crucible furnished with a nozzle in its bottom portion, said glass preform including a core glass in a rod shape that is inserted into a tube of a cladding glass having a lower refractive index than said core glass, the cladding tube adhering to the core rod thereby to form a unitary assembly, said assembly being inserted in a closed vessel in which an inert atmosphere is maintained; and softening the cladding tube locally and continuously from one end to the other with the pressure of the inert gas in the gap between the cladding tube and the core rod being held no higher than $10^{-1}$ Torr and with the pressure of the inert gas around the cladding tube being held no lower than 0.2 kg/cm²;
   heating the crucible only at the vicinity of the nozzle; and
   continuously drawing the glass into a fiber with the temperature of the crucible at the vicinity of the nozzle being maintained at such a level that the viscosity of the glass is within the range of $10^3$ to $10^{7.5}$ poises.

13. A process according to claim 1, wherein a fiber is drawn from the preform as it is heated in the crucible where an inert gas atmosphere is maintained with the pressure in said crucible being held higher than atmospheric pressure but not higher than 5 kg/cm$^2$;

the inside diameter $R_1$ of the nozzle in the bottom portion of the crucible is no smaller than 500 μm, with the upper limit being 0.95 as expressed by $R_1/R_2$ where $R_1$ is the nozzle inside diameter and $R_2$ is the outside diameter of the preform; and the cylindrical preform placed within the crucible has a diameter smaller than the inside diameter of said crucible, and the gap between the crucible and the preform is at least 2% of the inside diameter of said crucible.

14. A process according to claim 6, wherein the pressure of the gas in the gap between the cladding tube and the core rod is not greater than $10^{-1}$ Torr.

* * * * *